Patented Mar. 29, 1949

2,465,672

UNITED STATES PATENT OFFICE 2,465,672

REFRACTORY COMPOSITION AND METHOD OF MAKING

Emil Blaha, Philadelphia, Pa., assignor to Selas Corporation of America, a corporation of Pennsylvania No Drawing. Application October 20, 1943, Serial No. 507,015

4 Claims. (Cl. 106—44)

My invention relates to a method of producing an improved silicon carbide refractory body, and resulting molded refractory composition produced thereby, having surfaces which remain relatively dry and smooth and substantially free from blistering and the formation of objectionable silicon dioxide glaze when used at high temperatures.

While the invention is of great utility for supporting ceramic ware for firing operations, it is of especial importance wherever it is desired to employ a silicon carbide refractory body having surfaces which remain smooth and dry and free from blistering for relatively long periods of use at high temperatures.

Silicon carbide possesses many desirable properties and is a most satisfactory refractory material because of its high heat conductivity, heat-shock resistance and rigidity at high temperatures. However, one great objection to silicon carbide heretofore employed is its instability at temperatures as low as 1800° F., and this is particularly so when such refractory material is employed in a strongly oxidizing atmosphere. When silicon carbide of the character heretofore employed is heated to the temperature just mentioned or higher, it begins to dissociate into silicon dioxide and carbon dioxide gas. The silicon dioxide thus formed manifests itself by forming a glazed surface which, after prolonged heating, begins to blister and eventually forms a very rough and unsightly surface.

The glaze of silicon dioxide formed on the surface of silicon carbide bodies reacts very readily with any other refractory material coming in contact therewith at a high temperature, and, when this occurs, the refractory material tends to become bonded and strongly adherent to the glazed surface and cannot be removed therefrom without fracture. Hence, when silicon carbide tiles are employed to support ceramic ware for firing operations, it has usually been the practice to sprinkle a protective layer of sand or alumina on the tiles in order to prevent the ware being fired from sticking or being bonded to the silicon dioxide. The formation of a silicon dioxide glaze on silicon carbide bodies is highly annoying and objectionable. Moreover, when silicon carbide has heretofore been used for the firing of ceramic ware, high losses are incurred due to particles of sand falling off and lodging themselves on the glazed surface of the ceramic ware.

According to the present invention, the particles of a molded body of silicon carbide are coated with a material to provide a protective layer which slows down considerably the oxidation of the silicon carbide particles. By providing a protective coating of material of the character just described, oxidation of the silicon carbide particles is reduced to such an extent that, even after bodies of such refractory material have been in use for long periods of time at temperatures as high as 2700° F. and higher, the surfaces of the bodies remain dry and smooth and free from blistering and the formation of silicon dioxide glaze.

A material that has been found to be particularly useful for the purpose of coating particles of molded silicon carbide refractory bodies is zirconium oxide because, upon initially firing a silicon carbide refractory body, such material forms a protective coating having a coefficient of expansion which closely approximates that of silicon carbide.

When particles of silicon carbide are mixed with zirconium oxide and such mixture is fired at a temperature of 2400° F. or higher, after first being molded to the desired shape, the zirconium oxide reacts and combines with the silicon dioxide liberated from the silicon carbide to form a coating of zirconium silicate or zircon in situ on the silicon carbide particles.

Since the protective coating of zirconium silicate has a coefficient of expansion which is approximately that of silicon carbide, refractory silicon carbide bodies formed with such coatings on the individual particles can successfully withstand firing and heating to temperatures as high as 3000° F. and higher.

In preparing bodies of silicon carbide refractory material in which the silicon carbide particles are provided with a protective coating of the invention, finely pulverized silicon carbide may be mixed with finely divided zirconium oxide to form a coating in situ on the silicon carbide particles. A suitable liquid, such as water, for example, may be added to the mixture to form a thick slurry. The slurry is then molded to form bodies of desired shape. If desired, a small amount of inert organic substance, such as flour or dextrin, for example, may be added and incorporated in the slurry for the purpose of forming any temporary bond necessary to facilitate the molding of the bodies and providing green strength.

The bodies of refractory silicon carbide material thus formed are fired at suitable high temperatures of 2400° F. and higher, as previously mentioned. The silicon dioxide, liberated from the silicon carbide upon initially firing the bodies of refractory material, reacts and combines with the zirconium oxide mixed with the silicon carbide particles to form on the particles the silicate coating. The silicate coating is strongly adherent and thermo-chemically bonded to the silicon carbide particles.

Instead of mixing in a dry state the particles of silicon carbide and finely divided zirconium oxide to form the coating, and then forming the slurry with a suitable liquid vehicle, a thick slurry may first be prepared of the zirconium oxide and such slurry then poured over the finely pulverized silicon carbide particles in a suitable mixer.

The thickness of the coating formed is dependent upon the surface area of the silicon carbide particles and the quantity of material employed to form the coating. The finely pulverized silicon carbide particles may be of any desired size, and in many instances I have found particles ranging in size from 10 to 80 mesh quite satisfactory.

I have found that finely divided zirconium oxide is preferable because such material reacts readily with the silicon dioxide liberated from the silicon carbide particles to form the silicate coating in situ when the refractory bodies are initially fired. In such cases, the silicate coating of crystalline structure is thermo-chemically bonded to the silicon carbide particles. By employing zirconium oxide which is extremely fine and approaching colloidal structure, an even distribution of the oxide with the particles of silicon carbide is effected, and a uniform protective coating on the particles is insured upon initially firing the bodies of silicon carbide refractory material.

It has been found that the amount of the material preferably employed to form the coating on the silicon carbide particles should not be less than about ten per cent nor above about more than forty per cent by weight of the total mass of the bodies of silicon carbide refractory material prepared in accordance with the invention. Although it may be generally stated that more coating material is required for the more finely pulverized silicon carbide particles, this does not always hold true because one factor determining the amount of coating material required is the ultimate use of the bodies of refractory material. While a quantity of coating material amounting to about ten per cent by weight will be satisfactory in a particular case when silicon carbide particles of about 10 mesh in size are employed, it may be necessary to increase the quantity of coating material for the same size silicon carbide particles for another application where it is desired to use the silicon carbide refractory bodies at higher temperatures. When the size of the silicon carbide particles is about 100 mesh, the amount of coating material required may increase to about forty per cent by weight.

The addition of the coating material to the silicon carbide particles has the tendency to reduce slightly the heat conductivity of such refractory material. When refractory silicon carbide bodies of the invention are compared with silicon carbide refractory bodies not provided with such a protective coating on the silicon carbide particles, this slight reduction in the heat conductivity just-mentioned is insignificant and is more than compensated by the additional benefits imparted to the silicon carbide bodies in which the surfaces remain dry and smooth and free from objectionable glaze formation and blistering even when used at high temperatures for relatively long periods of time.

What is claimed is:

1. A batch for the manufacture of silicon carbide refractory bodies consisting of from 60 to 90 percent by weight of silicon carbide particles and a coating material for the particles comprising finely divided zirconium oxide which consists of from 10 to 40 percent of the batch by weight.

2. In the art of making a refractory body consisting of from 60 to 90 percent by weight of silicon carbide, the improvement which comprises the steps of mixing and distributing with silicon carbide particles finely divided zirconium oxide consisting of from 10 to 40 percent by weight, forming a body of the desired shape from the mix, and firing the body to an elevated temperature to form an oxidation resistant coating of zirconium silicate in situ on the particles which holds the particles together and protects the body from blistering during use at high temperatures.

3. In the art of making refractory bodies consisting of from 60 to 90 percent by weight of silicon carbide, the improvement which comprises the steps of mixing silicon carbide particles and finely divided zirconium oxide, such oxide consisting of from 10 to 40 percent of the mix, and forming a body to the desired shape from the mix, and firing the body.

4. As a new article of manufacture, a refractory shape consisting of from 60 to 90 percent by weight of silicon carbide and the remainder zirconium oxide, said shape comprising silicon carbide particles and a bond therefore containing zirconium silicate, which is formed in situ, such bond forming a coating substantially encasing the silicon carbide particles to resist oxidation of the particles during use at high temperatures.

EMIL BLAHA.

REFERENCES CITED

The following references are of record in the file of this patent:

UNITED STATES PATENTS

| Number | Name | Date |
|---|---|---|
| 1,376,091 | Hartmann | Apr. 26, 1921 |
| 1,546,833 | Geiger | July 21, 1925 |
| 2,040,236 | Nenner et al. | May 12, 1936 |
| 2,104,841 | White | Jan. 11, 1938 |
| 2,272,038 | Morgan | Feb. 3, 1942 |
| 2,314,758 | Berns | Mar. 23, 1943 |
| 2,324,119 | Swentzel | July 13, 1943 |

FOREIGN PATENTS

| Number | Country | Date |
|---|---|---|
| 340,303 | Germany | 1921 |
| 344,840 | Germany | 1921 |
| 363,165 | Germany | 1922 |
| 371,675 | Germany | 1923 |
| 205,653 | Switzerland | 1939 |